United States Patent
Pingel et al.

[11] Patent Number: 6,092,826
[45] Date of Patent: Jul. 25, 2000

[54] TOW STRAP APPARATUS

[75] Inventors: Wayne Pingel; Donna Pingel, both of Adams, Wis.

[73] Assignee: Pingel Enterprise, Inc., Adams, Wis.

[21] Appl. No.: 09/072,509

[22] Filed: May 4, 1998

[51] Int. Cl.[7] .................................................. B60D 13/00
[52] U.S. Cl. ...................... 280/480.1; 280/480; 280/449
[58] Field of Search ............................... 280/480, 480.1, 280/505, 449; 410/10, 11, 12, 23; 24/298, 300, 301, 302, 306, 442

[56] References Cited

U.S. PATENT DOCUMENTS

| | | | |
|---|---|---|---|
| D. 402,539 | 12/1998 | Pingel et al. .......................... D8/359 |
| 3,881,751 | 5/1975 | Colby ..................................... 280/480 |
| 4,054,267 | 10/1977 | Berg et al. ............................. 254/164 |
| 4,407,460 | 10/1983 | Khudaverdian ....................... 242/86.5 |
| 4,493,502 | 1/1985 | Campbell, Jr. ........................ 293/128 |
| 4,676,417 | 6/1987 | Hirschkoff ............................ 224/202 |
| 4,842,458 | 6/1989 | Carpenter ................................. 410/3 |
| 5,090,503 | 2/1992 | Bell .......................................... 182/5 |
| 5,215,325 | 6/1993 | Novotny et al. ..................... 280/480.1 |
| 5,289,619 | 3/1994 | Pileggi ................................... 24/306 |
| 5,308,101 | 5/1994 | Monty .................................. 280/480.1 |
| 5,476,280 | 12/1995 | MacMullan .......................... 280/480.1 |
| 5,785,011 | 7/1998 | Gitterman, III ........................ 119/865 |

FOREIGN PATENT DOCUMENTS

| | | | |
|---|---|---|---|
| 567912 | 12/1958 | Canada ................................... 280/480 |
| 620431 | 9/1935 | Germany .............................. 280/33.14 |
| 1939006 | 7/1968 | Germany ................................ 280/316 |
| 2419459 | 6/1975 | Germany ................................ 280/316 |
| 1755474 | 11/1979 | Germany ................................ 280/316 |
| 4101679 | 7/1992 | Germany ................................ 280/480 |
| 622186 | 6/1961 | Italy ....................................... 280/450 |

*Primary Examiner*—Paul N. Dickson
*Assistant Examiner*—Daniel Yeagley
*Attorney, Agent, or Firm*—Lathrop & Clark LLP

[57] ABSTRACT

A safe tow strap apparatus is provided in which a tow strap is attached to the towing vehicle and a hook/loop fastener device is used to secure the tow strap to the towed vehicle.

10 Claims, 2 Drawing Sheets

TOW STRAP APPARATUS

BACKGROUND OF THE INVENTION

1. Field of the Invention

The present invention relates generally to apparatus used for towing vehicles. More particularly this invention relates to towing straps used to tow motorcycles or cars at racing events.

2. Description of the Prior Art

Previously, tow straps have been wound on a spring loaded reel having a metal hook for attachment to the towing vehicle and a second metal hook affixed to the free end of the strap to facilitate attachment to the towed motorcycle or car. When vehicles are towed through the pit area, people inevitably walk in front of the towed vehicle, often forcing the operator of the towed vehicle to brake suddenly. In such a situation, dislodgement or breakage of the metal hook on the strap end results, and a dangerous condition occurs, due to the high velocity recoil snap of the reel as it rewinds the tow strap with a metal projectile attached. Similarly, when the person unhooking the strap from the towed vehicle prematurely lets go of the strap, the strap with hook attached flies violently toward the towing vehicle. No tow strap device has been presented in the prior art which eliminates this dangerous condition.

SUMMARY OF THE INVENTION

Accordingly, it is the principal object of the present invention to provide a safe tow strap apparatus which avoids the danger inherent in the recoil of prior tow strap reels having metal hooks affixed to the tow strap. This object is accomplished in the preferred embodiment by providing a tow strap attached to and wound on a spring biased reel, a hook affixed to the reel for attachment to the towing vehicle, and a soft hook/loop fastener device affixed to the tow strap free end for securing the strap to the towed vehicle. With the metal hook now eliminated from the free end of the strap, the danger of an uncontrolled recoil is eliminated. Further, by varying the amount of hook/loop fastener engaged, the degree of attachment strength can also be varied.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
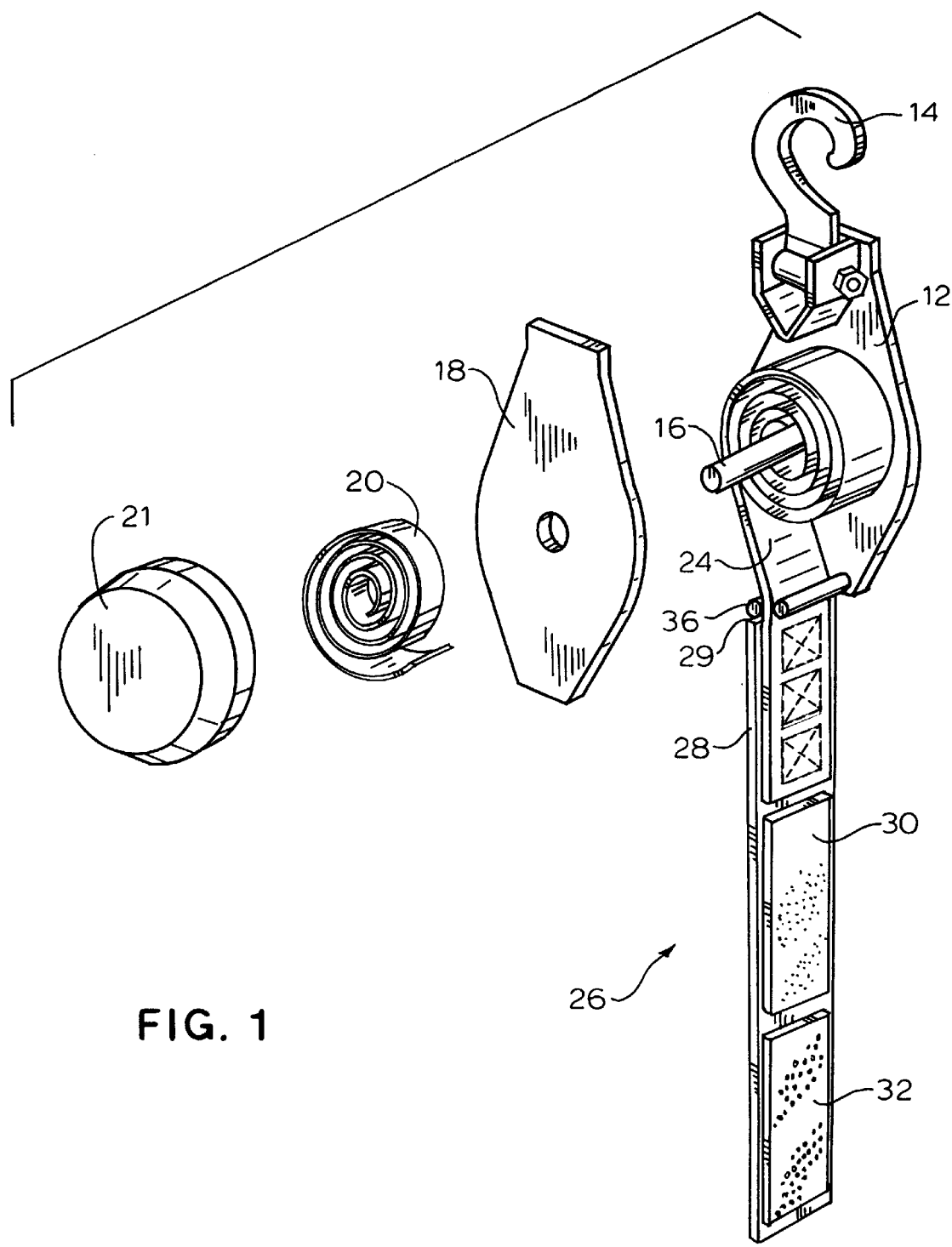
FIG. 1 is an exploded perspective view of the tow strap of the present invention.

Turning first to FIG. 1 there is shown (in an exploded view) a tow strap reel in accordance with the present invention. This reel includes a base member 12 having hook means 14 affixed thereto for attachment to the towing vehicle. An axle 16 is mounted to the base member for rotation and protrudes through a base member cover plate 18. A helical spring 20 attaches to the axle and to the base in a manner well known in the art to provide a rewinding bias to the reel, and a cap 21 serves to cover the spring apparatus.

A strap 24 is attached to the axle and wound thereon to provide a deployable coiled strap. The free end 26 of the strap includes an attached end piece 28 having a first surface 22 fixed to a first surface 25 of the strap member and soft fastener means in the form of opposing sections 30 and 32 of a hook/loop fastener device (such as Velcro) attached thereto. At the attachment of the end piece 28 an edge 29 is formed which abuts the reel guides 36 and blocks rewinding of the free end into the reel.

Figure 2:
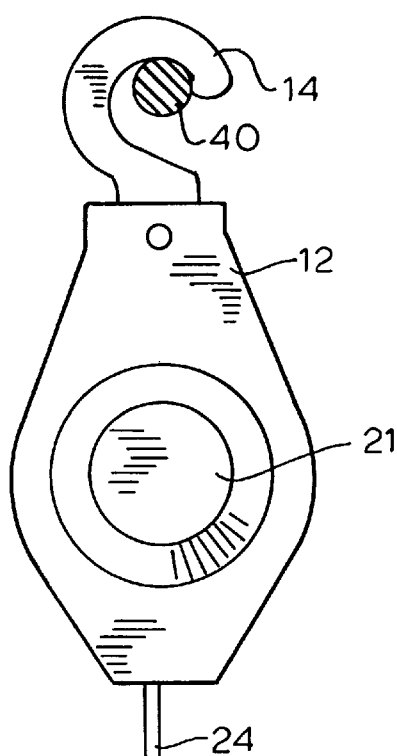
FIG. 2 is a side view of the apparatus of FIG. 1 showing its attachment to the towed motorcycle or car.

The operation of this device is depicted in FIG. 2. Particularly, the hook 14 of the base member is attached to a member 40 of the towing vehicle, the strap is deployed against the spring bias and the end piece 28 of the strap is wrapped around a member 42 of the towed vehicle. The opposing sections of the hook/loop fastener 30 and 32 are then placed in fastening contact with each other to secure the tow strap to the towed vehicle. By varying the amount of hook/loop fastener placed in fastening contact (i.e. overlap) the degree of attachment strength is thereby varied. This control of attachment strength allows the user to preset a safe break-away load in anticipation of possible sudden braking of the towed vehicle.

Figure 3:
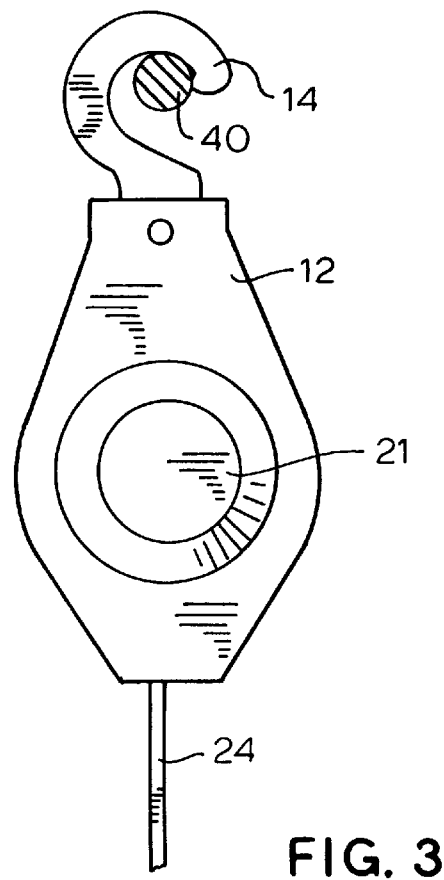
FIG. 3 is a side view of a second embodiment showing alternative attachment to the towed motorcycle or car.

In an alternative embodiment (FIG. 3), a second end piece 50 having a second surface 27 fixed to a second surface 23 of the strap member serves to provide additional variable attachment strength. The first end piece 28 is wrapped around the member 42 of the towed vehicle, as before, and the opposing hook/loop fastener sections (30 and 32) are joined. Then a second hook/loop attachment is formed between the hook/loop material 52 on the second end piece and an additional outside hook/loop section 54 provided on the first end piece.

From the foregoing description, it will be apparent that modifications can be made to the apparatus without departing from the teachings of the present invention. Accordingly, the scope of the invention is only to be limited as necessitated by the accompanying claims.

What is claimed is:

1. Tow strap apparatus for towing a towed vehicle with a towing vehicle comprising:

a reel for attachment to the towing vehicle;

a strap member extending from the reel and exhibiting a free end;

a first end piece fixed to said strap member at said free end; said first end piece having portions defining an abutment edge for retaining said free end;

a section of hook fastener material fixed to a first surface of the first end piece; and an opposing section of loop fastener material fixed to the same first surface of the first end piece, such that the first end piece, when wrapped around a member of the towed vehicle, presents the section of loop fastener section to be placed in fastening contact with the hook fastener section, to thereby secure the tow strap to the towed vehicle, the connection of the section of loop fastener and section of hook fastener presetting a safe break-away load by varying the amount of hook loop fastener material placed in contact with one another in an overlapping degree in anticipation of sudden braking.

2. The tow strap apparatus of claim 1 further comprising a second end piece fixed to a second surface of said free end, the second end piece having a second section of hook or loop fastener material, selected to engage with the said sections of hook or loop fastener material fixed to said first surface at a position closest to the strap member, such that when said hook or loop section of material positioned closest to the strap free end is engaged with the said opposing section of hook or loop material, the second end piece second section of hook or loop fastener material may be engaged with said closest section of hook or loop fastener material, thereby defining a plurality of layers of loop sections and plurality of layers of hook sections.

3. The tow strap apparatus of claim 1 further comprising a plurality of strap ends having hook/loop fastening devices affixed thereto.

4. Tow strap reel apparatus comprising:
   a base member for attachment to a towing vehicle;
   an axle mounted in said base member for rotation;
   spring bias means for providing a rotational spring bias in said axle member;
   a deployable strap member, attached to and wound about said axle member and exhibiting a free end, wherein deployment of said strap member acts against said spring bias means; and
   a portion of the strap member defining a first end piece at said free end which includes an abutment edge for retaining said free end;
   a section of hook fastener material fixed to a first surface of the first end piece; and
   an opposing section of loop fastener material fixed to the same first surface of the first end piece, such that the first end piece, when wrapped around a member of a towed vehicle, presents the section of loop fastener section to be placed in fastening contact with the hook fastener section, to thereby secure the tow strap to the towed vehicle, the connection of the section of loop fastener and section of hook fastener presetting a safe break-away load by varying the amount of hook loop fastener material placed in contact with one another in an overlapping degree.

5. The tow strap reel apparatus of claim 4 further comprising guide means affixed to said base member, wherein said strap member is deployed therethrough.

6. The tow strap reel apparatus of claim 4 further comprising a second end piece fixed to a second surface of said free end, the second end piece having a second section of hook or loop fastener material, selected to engage with the said sections of hook or loop fastener material closest to the strap member, such that when said hook or loop section of material positioned closest to the strap free end is engaged with the said opposing section of hook or loop material, the second end piece second section of hook or loop fastener material may be engaged with said closest section of hook or loop fastener material, thereby defining a plurality of layers of loop sections and a plurality of layers of hook sections.

7. The tow strap reel apparatus of claim 6 further comprising a plurality of strap ends having hook/loop fastening devices affixed thereto.

8. The tow strap reel apparatus of claim 6 further comprising guide means affixed to said base member, wherein said strap member is deployed therethrough.

9. The tow strap reel apparatus of claim 7 further comprising guide means affixed to said base member, wherein said strap member is deployed therethrough.

10. A first vehicle attached to a second vehicle by a towing strap, comprising:
   a reel for attachment to the first vehicle, the reel containing a spring connected to the towing strap so as to retract the strap towards the reel, the reel having guides through which the towing strap is retracted, the tow strap extending from the reel and having a free end containing hook/loop fastener means and an edge which abuts the reel guides, the edge blocking rewinding of the free end into the reel;
   the second vehicle being attached to the free end of the towing strap by the hook/looped fastener means; controlling a preset safe breakaway of said second vehicle by varying the amount of overlapping hook/loop fastener means to a degree of attachment strength in anticipation of a sudden braking of said second vehicle;
   wherein the free end is without a metal hook.

* * * * *